UNITED STATES PATENT OFFICE.

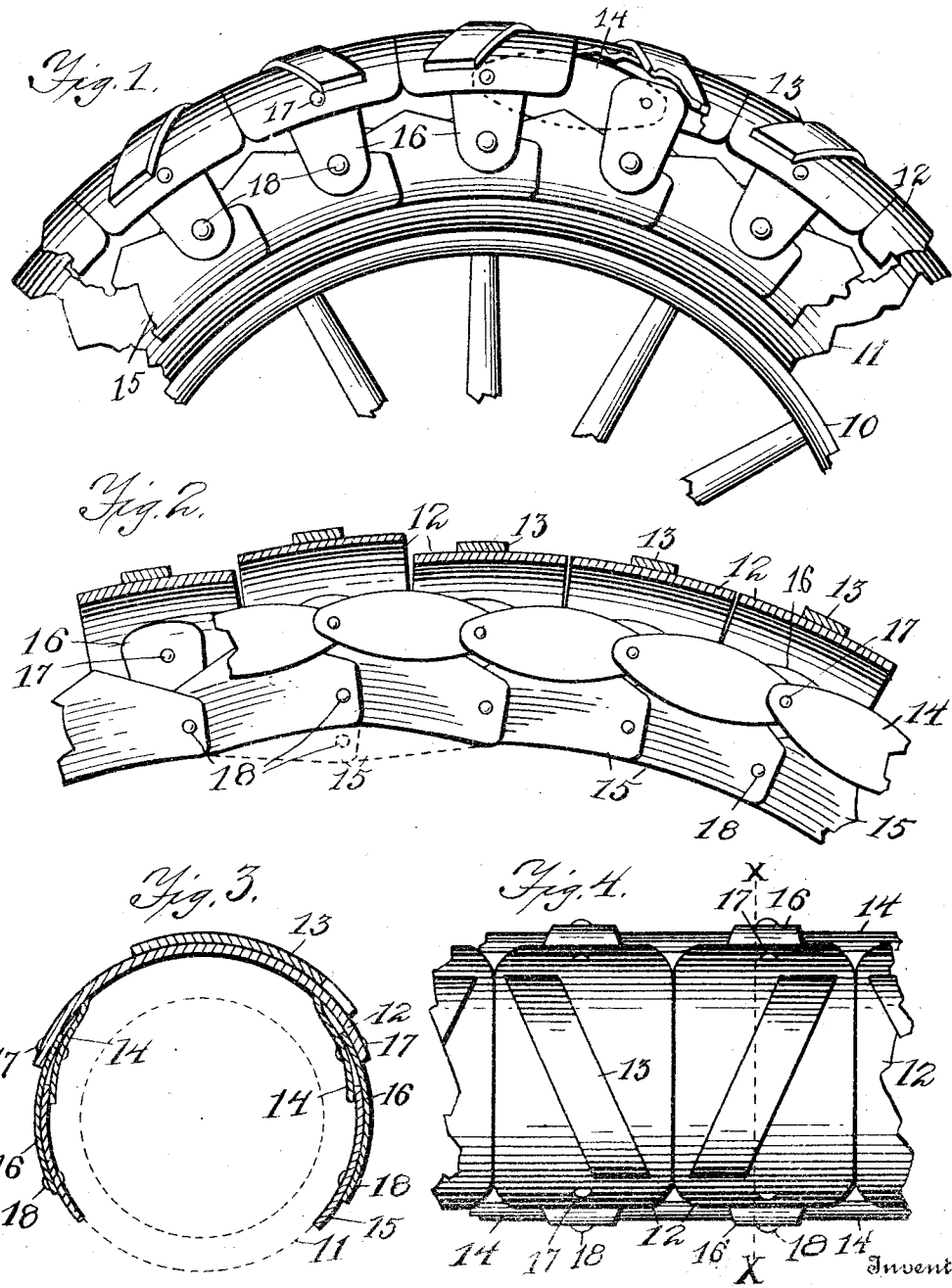

JOHN F. JOHNSON, OF JAMESTOWN, NEW YORK.

PNEUMATIC-RUBBER-TIRE PROTECTOR.

1,036,251.

Specification of Letters Patent. Patented Aug. 20, 1912.

Application filed March 25, 1912. Serial No. 686,138.

*To all whom it may concern:*

Be it known that I, JOHN F. JOHNSON, a citizen of the United States, and resident of Jamestown, county of Chautauqua, and State of New York, have invented new and useful Improvements in Pneumatic-Rubber-Tire Protectors, of which the following, taken in connection with the accompanying drawing, is a specification.

The invention relates to armors or tread protectors for pneumatic tires, and the object of my improvement is to provide a tire protector which has a series of non-interlapping steel plates around the tread, which steel plates are held in place and permitted outward or inward movement by means of a plurality of series of link plates which hold said plates in line, yet permit the tire to flatten out and return to round normal form without springing the connective link plates permanently out of shape, said link plates immediately returning to normal position when exterior pressure is removed from the tire; and the invention consists in the construction and combination of the parts as shown in this specification and the accompanying drawings and pointed out in the claims.

In the drawings, Figure 1 is an elevation of a portion of a tire attached to a wheel rim with the armor attached, a portion of one of the steel tread plates being broken away to show the link connection thereto. Fig. 2 is a lengthwise sectional view of a portion of the armor for the tire showing the inner side of the connective link plates for holding the tread plates in place. Fig. 3 is a crosswise sectional view of the protector at line X X in Fig. 4, showing the construction and arrangement of the parts. Fig. 4 is a plan view of a portion of the tread of the protector.

Like numerals of reference refer to corresponding parts in the several views.

The numeral 10 designates the wheel rim and the numeral 11 the rubber tire.

The tire protector consists of a series of tread plates 12 which are placed around the tire edge to edge and are made of steel plates curved to fit crosswise upon the pneumatic tire. The plates 12 are usually provided with antiskidding calks 13 which are attached to the plates 12 preferably in the oppositely diagonal position shown in Fig. 4, so that said calks would obtain the largest possible hold upon the roadway, thereby preventing the wheel from slipping and giving it a strong hold upon the supporting surface. The calks 13 may be riveted or welded to the tread plates 12.

The non-interlapping tread plates 12 are held in position upon the tire 11 by means of two continuous series of circumferential interlapping link plates which are designated by the numerals 14 and 15, which extend around each side of the tire, and a third series of radial or crosswise link plates 16 which connect the link plates 14 and 15 to the tread plates 12. These three series of link plates are preferably made of a thin spring sheet metal, as, for example, spring sheet brass or steel, which quickly returns to its normal shape even when bent therefrom many times. These thin connective link plates 14 and 15 do not need to be as thick as the tread plates 12 since their office is only to hold the tread plates 12 in position upon the tire. The form of the tire also and the arrangement of the multiple series of link plates is such that the draw of the different parts upon one another aids in the return of said parts to their normal shape around the tire.

The arrangement of the three sets of link plates is as follows: The series of link plates 14 are of a sufficient length and breadth to fit closely within the ends of the tread plates 12 and be pivotally connected thereto by centrally placed rivets 17, which rivets also pivotally hold the outer ends of the radial link plates 16 besides holding the interlapping ends of the link plates 14. The shield-shaped link plates 15 are similarly lapped, preferably in the opposite direction from the link plates 14, and pivotally connected to one another by means of the rivets 18 which rivets 18 also pivotally hold the inner ends of the radial link plates 16. The outer ends of the radial link plates 16 extend within the inner side of the ends of the tread plates 12 between said tread plates 12 and the link plates 14, and the inner ends of the radial link plates 16 extend to the outer side of the link plates 15, thus completing a double series of circumferential link plates 14 and 15 and of radial or crosswise connective link plates 16, the two rivets 17 and 18 being placed radially in respect to the wheel and about midway of the width of each end of the tread plates 12 so that each tread plate 12 is held firmly in position, yet is permitted independent radial outward or inward movement, as shown in Fig. 2; one of the plates 12 being shown as having moved outward from the others thereby drawing the attached link plates out of line. Should the tread plate 12, which is shown pushed out, have been pushed inward, it would have pushed the link plates 15 into the position shown in dotted line in Fig. 2. It will accordingly be seen that the multiple series of link plates hold the tread plates firmly in line, yet permit the movement of said tread plates without interlapping upon one another and thereby being bent out of shape, the connective links being so attached as to draw all the parts into the normal round tire form as soon as the exterior pressure is removed.

I claim as new:

1. A device of the class described comprising a series of tread plates to fit the periphery of the tire, a double series of circumferential link plates on each side of said tread plates, and a series of radial cross link plates pivotally connecting said double series of circumferential link plates and said tread plates.

2. A device of the class described comprising a series of non-interlapping tread plates to fit the periphery of a tire, a series of circumferential interlapping link plates pivotally connecting the ends of said tread plates, a second series of interlapping circumferential link plates alongside the first series of said link plates, and a third series of crosswise link plates pivotally connected to both of said series of circumferential link plates and to the ends of said tread plates on each side of the tire to hold said tread plates in position.

In testimony whereof I affix my signature in presence of two witnesses.

JOHN F. JOHNSON.

Witnesses:
JOSEPH E. JOHNSON,
WILLIAM R. JOHNSON.